Oct. 13, 1931.  C. O. THOMAS  1,827,176
FLEXIBLE COUPLING
Filed June 11, 1927   3 Sheets-Sheet 1
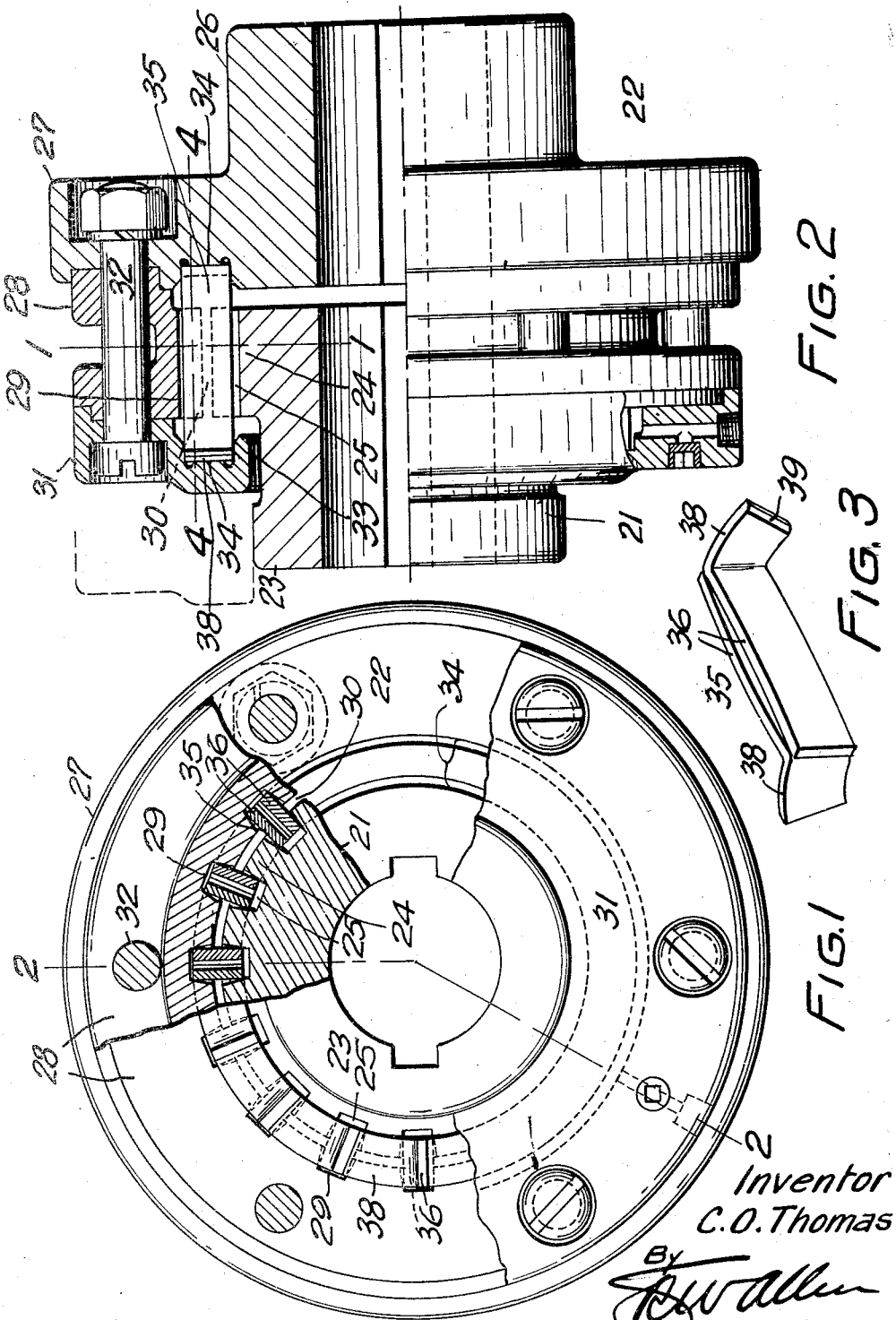
Inventor
C. O. Thomas Oct. 13, 1931.          C. O. THOMAS          1,827,176
                      FLEXIBLE COUPLING
                    Filed June 11, 1927      3 Sheets-Sheet 2
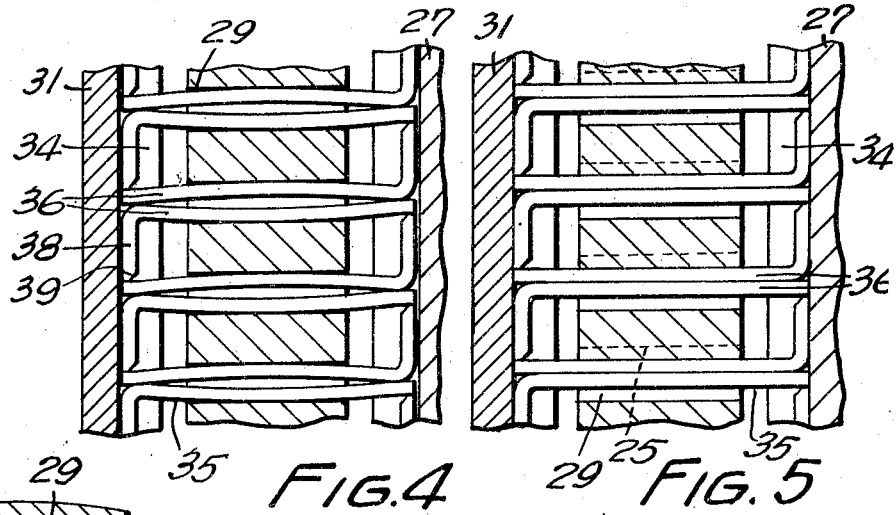
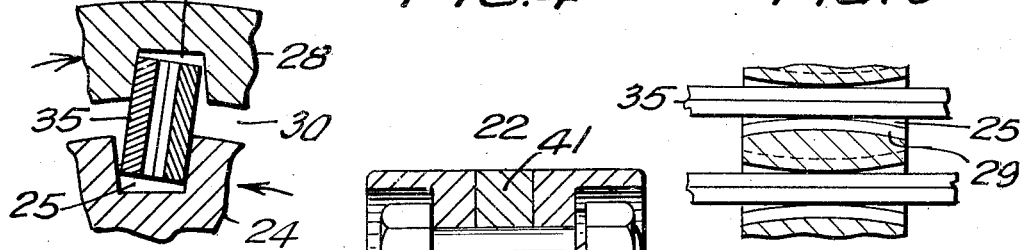
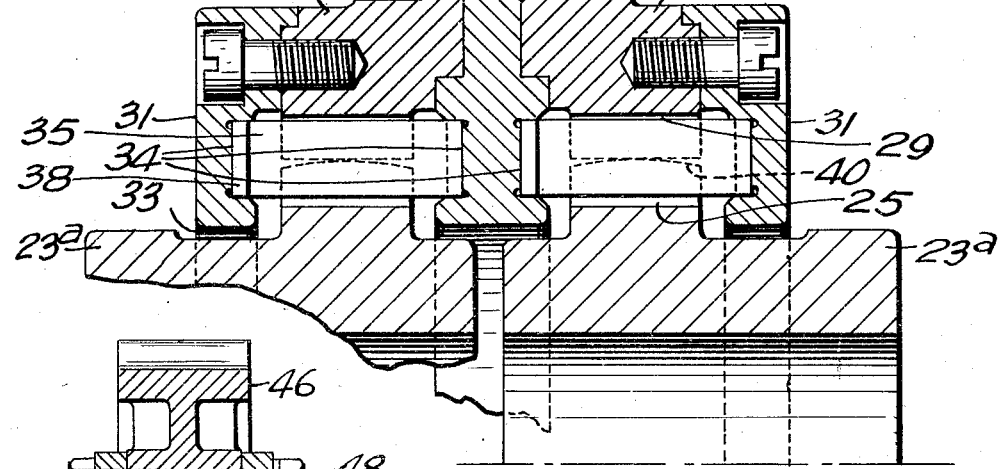
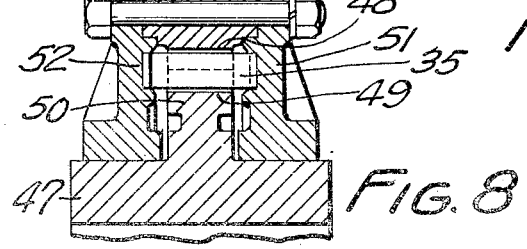
Inventor
C. O. Thomas
By [signature]
Attorney

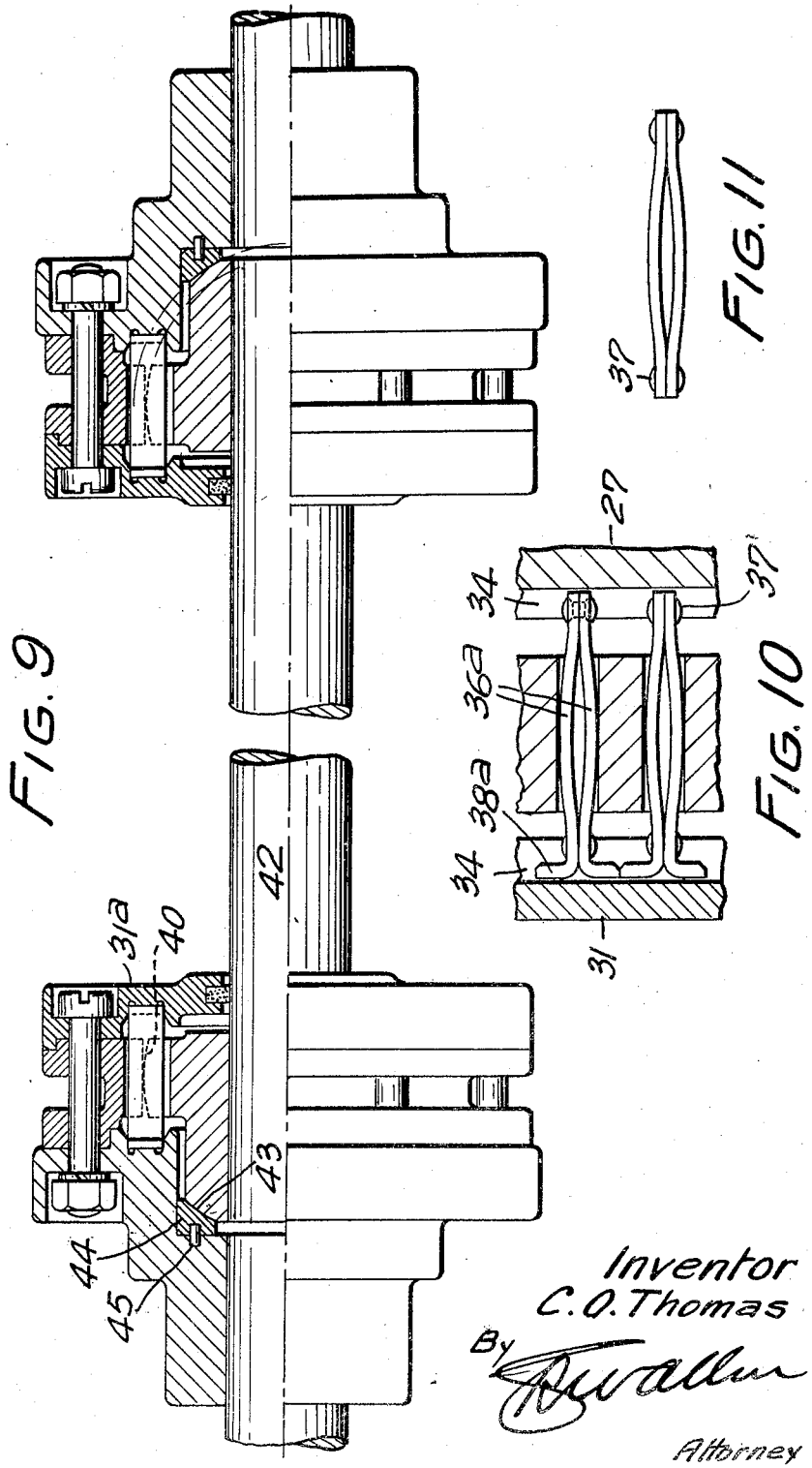

Patented Oct. 13, 1931

1,827,176

UNITED STATES PATENT OFFICE

CECIL OLDRIEVE THOMAS, OF MONTREAL, QUEBEC, CANADA

FLEXIBLE COUPLING

Application filed June 11, 1927. Serial No. 198,172.

This invention relates to improvements in couplings designed for the connection of shafts in end to end relation or of gears, pulleys and the like to shafts, and serviceable also as a universal joint.

The primary object of the invention is to provide a flexible coupling, which will yield to a limited extent to overloads imposed upon it and which will also be flexible to the extent of accommodating itself to slight misalignment of two shafts.

A further object is to provide a flexible coupling so constructed that the load is distributed uniformly around the circumference of the coupling.

A still further object is to provide a coupling which may be easily and inexpensively manufactured.

Various other objects and the advantages of the invention will be ascertained from the following description.

The coupling comprises essentially a pair of complementary members with mating grooves therein and a series of normally curved springs seated in the grooves of the members and forming driving connections between them, said springs tending to be flexed with straightening effect upon occurrence of overload conditions in the coupling. The springs are each disposed on one side of its longitudinal axis in a groove of one member and on the other side of its longitudinal axis in the corresponding groove of the other member.

In the accompanying drawings which illustrate various embodiments of the invention but to which embodiments and the details thereof the invention is not confined:—

Fig. 1 is an end elevation of the coupling partly broken away to show the interior construction and partly in section on the line 1—1 of Figure 2.

Fig. 2 is a side elevation of the coupling with parts in section on the line 2—2 of Figure 1.

Fig. 3 is a perspective view of one form of connecting member.

Fig. 4 is a horizontal development of a circumferential sectioning at a zone indicated by the line 4—4 of Figure 2, and shows connecting springs in their normal condition.

Fig. 5 is a view similar to Figure 4 showing the form of the springs under overload conditions.

Fig. 6 is a fragmentary sectional view illustrating a modified form of groove.

Fig. 7 is a half central longitudinal section of a coupling designed to have additional resiliency or to serve as a universal joint.

Fig. 8 is a half central longitudinal section illustrating the coupling as used to connect a gear, pulley or the like to a shaft.

Fig. 9 is a view similar to Figure 2 illustrating another adaptation of the device to give added resiliency and to serve as a universal joint.

Figs. 10 and 11 are plan views of alternative forms of spring connecting members.

Fig. 12 is a sectional view similar to Figure 5, illustrating a further modified form of groove.

Referring more particularly to the drawings, 21 and 22 designate the male and female members respectively of a coupling. The male member 21 comprises a hub 23 having a flange 24 of any suitable diameter formed on its circumferential surface with a plurality of grooves 25 preferably arranged in parallelism with the axis of the hub and preferably formed with straight parallel side walls. The female member comprises a hub 26 having a flange 27 of a diameter suitably greater than the flange of the male member. The flange 27 has connected thereto a sleeve 28 which, in assembled position of the coupling members, encircles the flange of the male member and is provided with a series of internal grooves 29 corresponding to the grooves of the male member, that is to say, of the same number, spacing, shape and relation to the coupling axis. Preferably, a clearance 30 exists between the sleeve 28 and the flange 24, so as to permit of a slight relative movement of the members in case of trifling misalignment of the shafts to which they are connected. An end ring 31 is provided on the female member and is of such dimensions as to project radially inward from the bore of the sleeve 28 for at least such distance as will cover the ends of the grooves of the male member. The sleeve 28 and ring 31 are rigidly connected to the female member flange 27 by any suitable means, most conveniently a single set of bolts 32 passing through all three members. It will, however, be understood that the ring may be independently connected to the sleeve and the sleeve to the flange. Preferably, the internal diameter of the ring is an easy slip fit on the end of the hub, as indicated by the broken lines in Figure 2, so that when the ring is disconnected from the female member it may be readily moved over the end of the male member hub to give access to the ends of the grooves 25 and 29. The male member hub should be circumferentially channelled as at 33, so that the ring will not bear upon the hub in the case of slight misalignments.

The adjacent faces of the flange 27 and ring 31 are provided with an annular groove 34, the grooves of the two members being preferably of exactly the same inside and outside diameters. These grooves are provided to receive and hold the ends of the spring members which connect the male and female members of the coupling. It will be noted that, since the ring 31 is attached to the flange 27, the spring connecting members are carried entirely by the female member of the coupling, but it will be understood that this is merely a matter of the convenient mechanical arrangement illustrated and that, if desired, the arrangement may be otherwise, even to elimination of the grooves.

Each of the spring connectors, designated as a whole by the numeral 35, is preferably a full elliptical spring and may take a variety of forms of which three are shown in Figures 3, 10 and 11. In each form, the connector comprises a pair of bent leaves 36 formed of preferably flat spring material and arranged with their concave sides facing. The two leaves forming a connector may be entirely disconnected from one another, as shown in Figure 3, or may be connected at their ends, as shown in Figures 10 and 11, by means of rivets 37 or other suitable means. In the case of the separate or disconnected leaves, the two leaves of each connector are held in proper operative relation by their assembly in the coupling and function exactly as if fixed together after the manner of Figures 10 and 11. In the form of connector shown in Figure 3, each of the leaves 36 has at one end a tail 38 projecting from the convex side of the leaf. The tails 38 are curved edgewise as best shown in Figure 3, the radius of curvature conforming to the radius of the grooves 34 in the coupling for which the connectors are adapted. The free end of each tail is chamfered, as shown at 39, on what may be termed the inner surface. The connector leaves of the form shown in Figure 3 are preferably all alike throughout the coupling, so that when assembled in pairs to produce the elliptical spring connectors, the tails 38 project from one side of the members at one end and from the opposite side at the opposite end. The tails fit snugly in the grooves 34 and are of such length that, when the connectors are positioned in the sleeve grooves 29, the tails make contact at their ends with the tailless ends of the leaves of adjoining connectors, as will be clearly seen from Figures 1, 4 and 5. Spring members of the form shown in Figure 10 comprise leaves 36ª of the same body formation as in Figure 3, but with shorter tails 38ª arranged both at one end of each connector and arranged for end abutting relation with one another, when assembled in the coupling. The tails 38ª will naturally have the same edgewise curvature as the tails 38, so as to accommodate themselves to the annular grooves 34 and, because of the provision of the tails both at one end of each connector, the leaves of these connectors are right hand and left hand. The form of connector shown in Figure 11 is without any tails and may be used in couplings either with or without annular grooves 34. The connectors are so disposed that each leaf is located on one side of its longitudinal axis in a groove 25 and on the other side of its longitudinal axis in the corresponding groove 29, the connectors fitting snugly at their medial points between the side walls of the grooves so that, in the event of resistance to movement of the driven members of the coupling the connectors will tend to be flattened from the form shown in Figure 4 to that shown in Figure 5, thus permitting slight relative angular movement of the coupling member.

When the clearance 30 is provided between the concentric grooved surfaces of the coupling members, as shown in Figures 1 and 2, there is an upsetting tendency or tendency to rotation about their longitudinal axes exerted in the connectors, as illustrated in Figure 6. If the walls of the grooves are parallel, this tendency causes the load to be concentrated at the edges of the grooves with certain undesirable effects, among which is a tendency to destruction of the edges of the grooves. Of course the upsetting or rotating tendency in the connectors is resisted by engagement of the tails in the grooves 34 but, because of the resiliency of the connectors, there is a possible twisting action in the connector leaves which would permit undesirable concentration of pressure at the edges of the grooves. To avoid damage to the edges of the grooves and to further develop the resiliency of the connectors by utilizing their resistance to twisting, the side walls of the grooves may be slightly flared from bottom to top, as shown to an exaggerated degree in Figure 6. This formation of the grooves permits of a slight twisting action being exerted upon the connectors in the operation of the coupling, which will bring the connectors flatwise against those walls of the grooves which are receiving or transmitting force.

A coupling of the simple type shown in Figures 1 and 2 has, as already stated, the clearances 30 and 33, which permit the male and female members to adjust themselves to slight misalignments of the shafts to which they are connected, but it is not the intention that a coupling of this type should operate under conditions of misalignment such as would ordinarily indicate the use of a universal joint. When these conditions are encountered, a double coupling of the type shown in Figure 7 should be employed. In the double type of coupling, two exactly similar male member hubs 23ª are used and may have the flanges thereof spherically curved from centres in the axes of the hubs, as shown at 40. The female member encircles both of the male members and bears upon the spherically curved flanges 40, as clearly shown. The female member may be composed of a pair of sleeve members 28ª connected to an intermediate ring member 41, or may be otherwise formed as desired. When a ring member 41 is used, it is preferably diametrically split to facilitate the mounting and dismounting of the coupling. In the construction illustrated, the intermediate member or its equivalent is provided on opposite surfaces with the grooves 34 corresponding to those provided on the end rings 31.

When circumstances permit, two simple couplings of the type shown in Figure 2 may be connected to driving and driven shafts and in turn connected by an intermediate shaft 42, as shown in Figure 9. In such an application of the coupling, the flanges of the male members may be spherically formed as described in connection with Figure 7, and will bear in the female members. The remote ends of the two male member hubs may be spherically curved from the same centres as their flanges, as shown at 43, and a bearing ring 44 may be provided in each female member. Pins 45 bedded in the rings and in the female members may be used to hold the rings against rotation independently of the female members. This arrangement is of service when an end thrust is to be transmitted through the coupling, for example, in the case of the propeller shaft of a motor-boat or the like. Figure 9 also illustrates the inward projection of the end rings 31ª past the male member hubs and substantially into contact with the intermediate shaft 42, so as to provide increased accommodation for oil to lubricate the surfaces 40 and 43.

When any considerable amount of misalignment is provided for, it is desirable to flare the grooves of the male and female members at their ends, as shown to an exaggerated extent in Figure 12. If this flaring is not provided, the relative movement of the male and female member grooves at the ends of the axis of oscillation may cause the bearing between the groove walls and connectors to shift from the middle of the groove where the maximum flexibility of the connectors is encountered to the ends of the grooves, where there is substantially no flexibility in the connectors. When the grooves are longitudinally curved, as shown in Figure 12, to a proper degree, the action is a rolling one and the bearing points of the connectors and groove walls move only very slightly from their normal medial position. The results of groove curvature are of greatest advantage under overload conditions such that the connectors are flattened as in Figure 5.

While the invention has heretofore been described only in its application to the connecting of two shafts, it will be understood that it may be otherwise applied, for example, to the connecting of a gear or pulley to a shaft, as shown in Figure 8. In such an application, the gear or pulley 46 constitutes the female member and is provided with a separate hub 47, which is the male member of the coupling. The female member is provided with internal grooves 48 mating with external grooves 49 on the flange 50 of the male member. End rings 51 are connected to either the male or female member but preferably to the female member and may be provided with annular grooves 52 in which the ends of connectors 35 are seated, the connectors occupying the grooves of the male and female members as already described. The end rings are attached to one of the members and are a smooth running fit on the other member, so as to maintain the two members in proper concentric relation. The male member 47 is of course connected to a shaft in any usual or suitable way.

The operation of the coupling is as follows:—

The male and female members of the form shown in Figures 2 and 9 or the two male members in the form shown in Figure 7 are rigidly connected to two aligned or approximately aligned shafts, one of which is the driving shaft and the other the driven shaft. In the absence of the connectors 35, the two coupling members would be independently rotatable but, because of engagement of the connectors each in a groove of the male member and a groove of the female member, a driving connection is established between the two members. The number and strength (resistance to flexion) of the connectors is calculated according to the load to be transmitted through the coupling and is preferably such that under normal load and slightly over-load conditions the spring connectors are not flexed but retain their normal elliptical form. If the over-load, i. e., resistance to rotation of the driven shaft, is sufficient, the elliptical spring connectors are practically flattened or wholly flattened, as shown in Figure 5. When such flattening occurs, the power transmitting capacity of the connectors is obviously equal to the shearing resistance of the connectors or the strength of metal between the grooves of the male and female members. The yield of the connectors has a cushioning effect which is obviously very beneficial in absorbing sudden shocks both in a machine driven through the coupling and in a prime mover supplying power through the coupling. The effect of the spring connectors is therefore to cause a gradual application of both power and load above a certain amount which is the force necessary to initiate flexion of the connectors. Yielding of the connectors either by flattening or by twisting is accompanied by slight relative rotation of the coupling parts, as shown by comparison of Figures 4 and 5, and also by Figure 6. When the overload on the flattened or twisted connectors falls below their reactive effort, they tend to return the coupling members to their original relation. When a great amount of cushioning effect is desired, a plurality of sets of connectors may be coupled in series, for example, as shown in Figure 7, which illustrates a simple arrangement of this character. A still greater amount of flexibility may be obtained by using two or more couplings of the type shown in Figure 7 in the manner shown in Figure 9. While the two series of connectors are arranged end to end, it will be understood that this is not essential and that some other relation of the series may be established. It will be obvious that with a constant amount of flattening possible in the connectors the resulting relative angular movement of the coupling parts is greater with the connectors arranged on small pitch circles than on large, and it is also evident that for the same number of connectors of the same resistance to flexion the angular flexibility of the coupling is greater when the connectors are arranged on small pitch circles than on large. Thus, the load transmitting capacity of a coupling before flexion of the connectors occurs may be increased by increasing the pitch circle on which the couplers are arranged or by increasing the number of couplers on a given pitch circle. In the former case, the possible relative angular movement of the parts is decreased, while in the latter case it is not. Obviously, variations in the transmission capacity of the coupling may be effected by using connectors more or less flexible. Increasing the size of the pitch circle on which the connectors are arranged enables the use of more connectors of a given size without reducing the amount of metal between the grooves of the members or, on the other hand, enables the use of more greatly arched connectors. It is possible without unreasonably increasing the pitch circle diameter with relation to the shafts to employ enough connectors so that the total force transmitting capacity will be greater than the strength of the shafts.

If the two shafts are very slightly out of alignment, the clearances between the male and female members enable the coupling to adjust itself to the misalignment without imposing any additional load on the connectors unless over-load is encountered sufficient to completely flatten the connectors. To meet such a condition, especially if the misalignment is considerable, the side walls of the grooves may be longitudinally curved, as shown in Figure 12. In any case, only those connectors at or close to the ends of the axis of oscillation will be affected. With clearances between the grooved surfaces of the members, as shown in Figures 1 and 2, the transmission of force through the coupling produces an upsetting tendency in the connectors, as shown in Figure 6. When connectors with tails are used, this upsetting is resisted by engagement of the tails in the grooves 34, with the result that the connectors are subjected to a twisting action in addition to the flattening action. With parallel walled grooves, the contact between the grooves and connectors may therefore be regarded as being at the edges of the grooves. When the groove walls are very slightly flared from bottom to top, the normal contact of the groove walls and connectors is close to the bottoms of the grooves, so that a maximum twisting effort is exerted upon the connectors. As the connectors yield, the relation shown in Figure 6 is approached or attained, and the effect is to shift the loading points on the connectors from the bottoms of the grooves toward the clearance, thus decreasing the effectiveness of the twisting effort. This formation therefore has the effect of relieving the extreme edges of the grooves of much load, especially under overload conditions and, therefore, of prolonging the life thereof. Further, it enables the twisting resistance of the connectors to be utilized as well as their resistance to flattening. When the grooved surfaces of the male and female members are actually in contact, as shown in Figures 7, 8 and 9, the same advantages are realized by the flaring groove formation of Figure 6, though to a lesser extent, especially under over-load conditions which result in flattening of the connectors.

If a connector leaf should break, it may be very easily replaced by removing the bolts 32 and sliding the ring 31 and sleeve 28 in the axial direction of the coupling. Owing to the expansive action of the connectors which will hold them in the grooves of the male member, the sleeve may be removed without displacing the connectors from the male member, so that the connectors may be inspected and any damaged ones renewed and the sleeve then returned to position. If the broken connector has its tail bedded in the ring 31, the broken leaf may be renewed and a fresh leaf inserted without displacing the sleeve 28 or, in the case of connectors shown in Figures 10 and 11, the entire connector may be removed and replaced upon removal of the ring 31 only. A further advantage of the type of connector shown in Figures 10 and 11 is that, if desired, they may be removed with the sleeve from the male member; this owing to the absence of tails at the end adjacent the flange 27. Alternatively, if the tails of connectors of Figure 10 are bedded in the flange 27, the sleeve may be withdrawn without any precautions for retention of the connectors.

The connectors, as shown in either Figures 3 or 10, are designed to make contact with one another in the grooves 34, so that if, by any chance, a groove should be mal-formed or wear faster than adjoining grooves, load will be transmitted from one connector to the next through the tails thereof to effect load distribution and avoid over-loading or under-loading in one connector. Because of this contact between the connectors, the ends of their tails are chamfered, as at 39, to facilitate insertion as will be readily understood.

The action of the connectors in applications of the invention, such as shown in Figure 8, is exactly the same as already described.

From the foregoing description and the drawings, it will be readily seen that (disregarding the connectors) the coupling consists of only a few parts which may be readily produced at low cost. The connectors themselves are simple and may be very easily and cheaply manufactured. The breaking of one or even of several connector leaves in a coupling will not materially reduce the capacity of the coupling and will not render it inoperative. Couplings may be readily designed to have any desired capacity and flexibility by suitably varying the diameter of the pitch circle on which the connectors are arranged or the number of connectors. Obviously, the load and cushioning capacities of any given coupling may be varied by substituting connectors of greater or less flexibility and the great advantages of this last capability will be obvious.

While certain embodiments of the invention and certain details thereof have been illustrated, it will be understood that the invention is not confined to these embodiments or details, as other embodiments may be made as well as alterations of details and combinations of details.

Having thus described my invention, what I claim is:—

1. In a coupling, outer and inner members having concentrically related surfaces provided with mating grooves disposed parallel with the axis of the members and a series of springs carried by the outer member and engaged only at their central parts in the grooves of both members and forming flexible driving connections between the members.

2. In a coupling, outer and inner members having concentrically related surfaces provided with mating grooves disposed parallel with the axis of the members and a series of springs engaged intermediate their ends in the grooves of both members and held at their ends by the outer member only, said springs forming flexible driving connections between the members.

3. In a coupling, male and female members having concentrically related surfaces provided with mating grooves parallel with the axis of the members, said female member including two annularly grooved portions and a series of spring connectors mounted at their ends in the annular grooves of the female member and disposed intermediate their ends in the grooves of the male and female members.

4. In a coupling, a male member including a flange having the edge thereof provided with a series of grooves parallel with the member axis, a female member encircling and shrouding the grooved portion of the male member flange, said female member presenting an internally grooved surface, the grooves of which mate with the grooves of the male member, said female member being further provided with a pair of annular grooves disposed one on either side of the male member flange, and a series of spring connectors located at their ends in said annular grooves and located at their intermediate portions in the mating grooves of the male and female members.

5. In a coupling, a male member including a flange formed in its edge with a series of grooves disposed parallel with the member axis, a female member including a flange of greater diameter than the male member flange a sleeve carried by said female member flange encircling the male member flange and provided internally with grooves mating with the male member grooves, and an end ring carried by said sleeve shrouding the ends of the sleeve grooves and male member grooves, and spring connectors carried by the female member disposed in the grooves of the male and female members and held at their ends independently of said grooves by the female member flange and the end ring.

6. In a coupling, a male member including a flange formed in its edge with a series of grooves disposed parallel with the member axis, a female member including a flange of greater diameter than the male member flange, a sleeve carried by said female member flange encircling the male member flange and provided internally with grooves mating with the male member grooves, an end ring carried by said sleeve shrouding the ends of the sleeve grooves and male member grooves, said female member flange and said end ring being formed on their adjacent surfaces with annular grooves opposite the ends of the mating grooves, and spring connectors located at their ends in said annular grooves and located at their intermediate portions in the mating grooves thereby to connect the male and female members.

7. In a coupling, a male member including a flange formed in its edge with a series of grooves disposed parallel with the member axis, a female member including a flange of greater diameter than the male member flange, a sleeve carried by said female member flange encircling the male member flange and provided internally with grooves mating with the male member grooves, an end ring carried by said sleeve shrouding the ends of the sleeve grooves and male member grooves, said female member flange and said end ring being formed on their adjacent surfaces with annular grooves opposite the ends of the mating grooves, and elliptical spring connectors located at their ends in said annular grooves and at their intermediate portions in the mating grooves in position to be flexed with flattening tendency upon relative angular movement of the male and female members.

8. In a coupling, a male member including a flange formed in its edge with a series of grooves disposed parallel with the member axis, a female member including a flange of greater diameter than the male member flange, a sleeve carried by said female member flange encircling the male member flange and provided internally with grooves mating with the male member grooves, an end ring carried by said sleeve shrouding the ends of the sleeve grooves and male member grooves, said female member flange and said end ring being formed on their adjacent surfaces with annular grooves opposite the ends of the mating grooves, and spring connectors located at their intermediate portions in the mating grooves and including tail portions located in said annular grooves.

9. In a coupling, a pair of concentrically arranged members provided with mating grooves disposed parallel with the axis of the members, and a series of leaf springs normally curved from end to end and in the axial direction of the members each located partly in a groove of one member and partly in the mating groove of the other member and adapted to be flexed with flattening tendency upon relative angular movement of the members.

10. In a coupling, a pair of concentrically arranged members provided with mating grooves disposed parallel with the axis of the members, and a series of leaf springs normally curved from end to end and in the axial direction of the members, each arranged with approximately one longitudinal half located in a groove of one member and the other approximately longitudinal half located in the mating groove of the other member and adapted to be flexed with flattening tendency upon relative angular movement of the members.

11. In a coupling, a pair of concentrically arranged members provided with mating grooves disposed parallel with the axis of the members, and a series of elliptical springs arranged parallel with the members in the grooves thereof and each normally contacting only at its central portion with the sides of the grooves.

12. In a coupling, a pair of concentrically arranged relatively oscillatable members formed with mating grooves substantially parallel with the member axes, and a series of elliptical springs located in the member grooves substantially axially parallel with the members and adapted to be compressed upon relative rotation of the members.

13. In a coupling, a pair of concentrically arranged relatively oscillatable members formed with mating grooves substantially parallel with the member axes and a series of leaf springs normally curved in their longitudinal directions and located lengthwise in the member grooves in position to be flexed with flattening tendency upon relative rotation of the members.

14. In a coupling, a pair of concentrically arranged relatively oscillatable members formed with mating grooves substantially parallel with the member axes and a series of leaf springs normally curved in their longitudinal directions and arranged each with approximately one longitudinal half in a groove of one member and approximately the other longitudinal half in the mating groove of the other member whereby all said springs will be flexed with flattening tendency upon relative rotation of the members.

15. In a coupling, a pair of members presenting substantially concentric adjacent surfaces formed with a plurality of mating grooves, and a series of spring members located in the mating grooves in position to be partially rotated about their longitudinal axes upon relative angular movement of the coupling members, and means holding said spring members at their ends against rotation, whereby upon tendency to relative angular movement of the coupling members the spring members are subjected to torsional stress.

16. In a coupling, a pair of members presenting substantially concentric adjacent surfaces formed with mating grooves therein, a series of spring members located in the mating grooves in position to be partially rotated about their longitudinal axes upon relative angular movement of the coupling members, said spring members including tails seated in a recess formed therefor in one of the coupling members to hold the spring members against rotation at their ends, whereby upon relative angular movement of the coupling members the spring members are subjected to torsional stress.

17. In a coupling, a pair of members presenting concentric adjacent surfaces formed with mating grooves, one of said members being additionally provided opposite the ends of said mating grooves with an annular groove, a series of spring members of strip form located in the mating grooves and tending to be rotated about their longitudinal axes upon relative angular movement of the coupling members, and tails projecting laterally from said spring members and seated in said annular groove to resist rotation of the spring members, whereby upon relative angular movement of the coupling members, the spring members are subjected to torsional stress.

18. In a coupling, a pair of members presenting substantially concentric surfaces formed with mating grooves, one of said members being formed adjacent the ends of the mating grooves with an annular groove, a series of normally curved spring members located in the mating grooves in position to be flexed with straightening effect upon relative angular movement of the members and to simultaneously have imparted thereto a tendency to rotation about their longitudinal axes, and tails on said spring members seated in the annular groove and resisting the tendency to rotation, whereby the spring members are also subjected to torsional stress.

19. In a coupling, a pair of members presenting concentric surfaces formed with mating grooves, the side walls of said grooves diverging slightly from the bottoms to the tops of the grooves, and spring members of strip form located in said grooves and normally bearing against the side walls of the grooves adjacent the bottoms thereof, said spring members operating to resist relative angular movement of the coupling members and tending to be rotated about their longitudinal axes by tendency to relative angular movement of the coupling members, thereby to shift the points of engagement of the spring members and groove walls toward the tops of the grooves.

20. In a coupling, a pair of members presenting concentric surfaces formed with mating grooves, the side walls of said grooves diverging slightly from the bottoms to the tops of the grooves, spring members of strip form located in said grooves and normally bearing against the side walls of the grooves adjacent the bottoms thereof, said spring members operating to resist relative angular movement of the coupling members and tending to be rotated about their longitudinal axes by tendency to relative angular movement of the coupling members thereby to shift the points of engagement of the spring members and groove walls toward the tops of the grooves, and tails on said members bedded in an annular groove provided therefor in one of the members and operating to resist rotation of the spring members whereby the same are subjected to torsional stress.

21. A device according to claim 8 in which the tails of the spring connectors are curved edgewise in conformity with curvature of the annular grooves into which they fit.

22. A device according to claim 8, in which the spring connectors each comprise a pair of oppositely curved leaves and in which the tails project at opposite sides of the connectors.

23. A coupling comprising a pair of members having mating grooves therein and a series of separate springs located in the grooves and forming driving connection between the members, each of said springs being in contact with the adjacent springs for equalization of load entirely around the coupling.

24. A coupling comprising a pair of members having normally concentric surfaces formed with mating grooves and a series of separate springs extending substantially parallel with the coupling axis located in the grooves and forming driving connection between the members, each of said springs being in contact with the adjacent springs for equalization of load entirely around the coupling.

25. A coupling comprising a pair of members having normally concentric surfaces formed with mating grooves and a series of separate springs extending substantially parallel with the coupling axis located in the grooves and forming driving connection between the members, each of said springs comprising a pair of leaves normally curved from end to end and a pair of laterally and oppositely extending tail portions engaging adjacent springs for equalization of load.

26. A coupling comprising a pair of members having normally concentric surfaces formed with mating grooves having the side walls thereof slightly flared from bottom to top, and springs normally curved from end to end located lengthwise in the grooves and forming yielding driving connection between the members, said springs normally engaging the groove walls only near the groove bottoms and being normally spaced from the groove walls at the tops whereby relative rotation of the members tends to cause each spring to rotate about its own axis.

27. A coupling comprising a pair of members having normally concentric surfaces formed with mating grooves, and springs normally curved from end to end located lengthwise in the grooves and forming yielding driving connection between the members, the grooved surfaces of the members being spaced to induce rotation of the springs about axes parallel with the coupling axis and the walls of the grooves being flared from bottom to top to afford surface engagement for the springs upon rotation thereof and to reduce the rotating force applied to the springs.

28. A coupling comprising a pair of members having normally concentric surfaces formed with mating grooves, and springs normally curved from end to end located lengthwise in the grooves and forming yielding driving connection between the members, the grooved surfaces of the members being spaced to induce rotation of the springs about axes parallel with the coupling axis and the walls of the grooves being flared from bottom to top to afford surface engagement for the springs upon rotation thereof and to reduce the rotating force applied to the springs, and means holding the springs at their ends against rotation whereby the springs are subjected to torsional stress.

29. A coupling comprising a pair of members having normally concentric surfaces formed with mating grooves disposed substantially parallel with the coupling axis, and a series of leaf springs engaged at their central portions in the grooves of said members and forming driving connection between the members, said springs being adapted to be partially rotated about longitudinal axes parallel with the coupling axis, and means holding the springs at their ends against rotation, whereby the springs are subjected to torsional stress resisting relative rotation of the members.

30. A structure according to claim 29, in which the springs are elliptical and by resistance to flattening further resist relative rotation of the members.

31. A structure according to claim 29, in which one of the members is formed with recesses receiving the ends of the springs to hold them against rotation as aforesaid.

32. In a coupling, concentrically arranged male and female members formed in their adjacent surfaces with mating grooves disposed parallel with the axis of the members and a series of normally curved leaf springs each disposed with substantially one longitudinal half in a groove of the male member and substantially the other longitudinal half in the mating groove of the female member, said springs being flexible in the circumferential direction of the coupling with flattening tendency.

33. In a coupling, concentrically arranged male and female members formed in their adjacent surfaces with mating grooves disposed parallel with the axis of the members, and a series of normally curved leaf springs each disposed with substantially one longitudinal half in a groove of the male member and substantially the other longitudinal half in the mating groove of the female member, said springs being flexible in the circumferential direction of the coupling with flattening tendency, and said female member being formed with circular grooves in which the ends of the springs are engaged.

34. In a coupling, concentrically arranged male and female members formed in their adjacent surfaces with mating grooves disposed parallel with the axis of the members, and a series of normally curved leaf springs each disposed with substantially one longitudinal half in a groove of the male member and substantially the other longitudinal half in the mating groove of the female member, said springs being arranged in pairs with their concave surfaces facing and their ends in contact forming elliptical structures engaging the side walls of the grooves at their medial points and compressible in the circumferential direction of the coupling.

35. In a coupling, concentrically arranged male and female members formed in their adjacent surfaces with mating grooves disposed parallel with the axis of the members, said female member being formed with circular grooves facing the ends of the parallel grooves, and a series of normally curved leaf springs each disposed with substantially one longitudinal half in a groove of the male member and substantially the other longitudinal half in the mating groove of the female member, said springs being flexible in the circumferential direction of the coupling with flattening tendency, and including laterally directed tails fitting snugly in said circular grooves.

36. In a coupling, a pair of members presenting parallel surfaces formed with mating grooves, the side walls of said grooves being slightly convexly curved from end to end, and spring members located in the mating grooves and forming driving connection between the coupling members.

37. In a coupling, a pair of members presenting parallel surfaces formed with mating grooves, the side walls of said grooves being slightly convexly curved from end to end, and a series of normally curved spring members located in said mating grooves and adapted to be flexed with straightening tendency upon relative angular movement of the coupling members.

38. In a coupling, a pair of members presenting parallel surfaces formed with mating grooves, the side walls of said grooves being slightly convexly curved from end to end, and a series of elliptical spring members disposed in said mating grooves in position to be compressed with straightening effect upon relative angular movement of the coupling members.

39. In a coupling, a pair of members provided with mating grooves disposed parallel with the axis of the members, the side walls of said grooves being longitudinally convexly curved, and spring members located in said grooves and providing driving connection between the coupling members, each of said spring members being located on one side of its longitudinal centre in a groove of one member and on the opposite side of its longitudinal centre in a groove of the other member.

40. In a coupling, a female member presenting a cylindrically formed inner surface co-axial with the member axis, a male member presenting a spherically formed portion centered in the male member axis and bearing in the cylindically formed surface of the female member, said members being formed with mating grooves in the cylindrical and spherical surfaces thereof, and a series of spring members located in the mating grooves and forming driving connection between the members.

41. In a coupling, a female member presenting a cylindrically formed inner surface co-axial with the member axis, a male member presenting a spherically formed portion centered in the male member axis and bearing in the cylindrically formed surface of the female member, said members being formed with mating grooves in the cylindrical and spherical surfaces thereof, and elliptical spring members located in the mating grooves and forming driving connection between the coupling members.

42. In a coupling, a female member presenting a cylindically formed inner surface co-axial with the member axis, a male member presenting a spherically formed portion centered in the male member axis and bearing in the cylindrically formed surface of the female member, said members being formed with mating grooves in the cylindrical and spherical surfaces thereof, each of said grooves having the side walls thereof convexly curved, and spring members located in the grooves and forming driving connections between the coupling members.

43. In a coupling, members formed with a plurality of series of inwardly facing grooves and members formed with a plurality of series of outwardly facing grooves mating with the inwardly facing grooves, and a plurality of series of elliptical spring members located in said mating grooves in positon to be compressed upon relative angular movement of the members.

44. In a coupling, a pair of female members formed with inwardly facing grooves, a pair of male members formed with outwardly facing grooves mating with the grooves of the female members, connection between the two members of one sort, and normally curved spring members disposed in the mating grooves and forming driving connections between the male and female members.

In witness whereof, I have hereunto set my hand.

CECIL OLDRIEVE THOMAS.